United States Patent [19]

Starkey

[11] Patent Number: 5,137,442
[45] Date of Patent: Aug. 11, 1992

[54] UNIVERSAL INTERNAL CORE LIFTER APPARATUS

[75] Inventor: Glenn Starkey, Lindenhurst, Ill.

[73] Assignee: D & L Incorporated, Wauconda, Ill.

[21] Appl. No.: 652,094

[22] Filed: Feb. 7, 1991

[51] Int. Cl.⁵ .............................................. B29C 45/44
[52] U.S. Cl. .................................. 425/438; 249/66.1; 425/441; 425/444; 425/556; 425/577; 425/DIG. 58
[58] Field of Search ............... 425/441, 577, 438, 444, 425/556, DIG. 58, 554; 249/74, 66.1

[56] References Cited

U.S. PATENT DOCUMENTS

| | | | |
|---|---|---|---|
| 3,293,697 | 12/1966 | Balint | 425/441 |
| 3,387,334 | 6/1968 | Belanger et al. | 425/441 X |
| 3,454,693 | 7/1969 | Crenshaw | 425/DIG. 58 |
| 4,101,256 | 7/1978 | White et al. | 425/DIG. 58 |
| 4,854,849 | 8/1989 | Sudo | 425/DIG. 58 |
| 4,956,142 | 9/1990 | Mangone, Jr. | 425/577 X |

FOREIGN PATENT DOCUMENTS 152034  11/1980  Japan .................................. 425/441

Primary Examiner—Richard L. Chiesa
Attorney, Agent, or Firm—Fitch, Even, Tabin & Flannery

[57] ABSTRACT

An internal core lifter in a mold is provided with both linear motion and pivotal seating in a universal coupling that slides linearly along an ejector plate. The pivotal seating allows the core blade to be used at various angles in different molds, thereby reducing the inventory of core blade needed. To resist high forces encountered during ejection and during the opening and closing of the mold, the preferred pivotal seating comprises wide arcuate dovetail surfaces on the lower end of the core blade and on a slidable support which has linear dovetail surfaces with the ejector plate. The upper end of the core blade may be configured to be part of the molding surfaces to mold an undercut in a plastic part. The upper end of the core blade is moved laterally from the undercut and then is shifted upwardly to engage and eject the part.

7 Claims, 2 Drawing Sheets

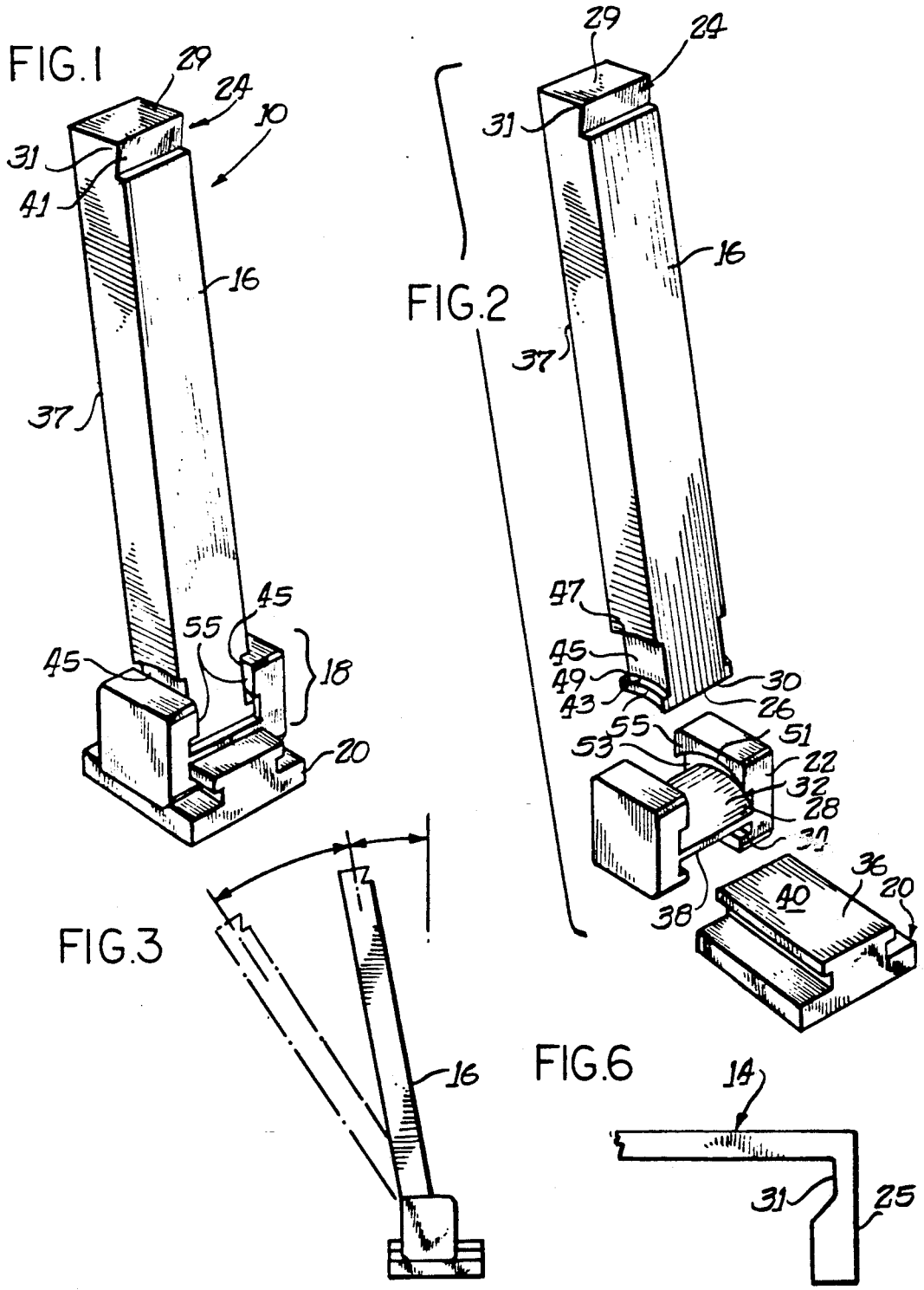

UNIVERSAL INTERNAL CORE LIFTER APPARATUS

FIELD OF THE INVENTION

The present invention is directed to providing an internal core lifter for the usual custom made core lifter. More particularly, the present invention is directed to a universal internal core lifter which readily adjusts through a range of angles.

BACKGROUND OF THE INVENTION

Internal core lifters are used within a mold device to mold and eject undercuts in plastic injection molds. An internal core lifter generally consists of a core blade seated at a predetermined angle achieved by mounting one end of the core blade at a fixed angle to a coupling which then slides linearly along a support mounted to the mold ejection plates. These internal core lifters are custom designed to fit specific molds on a case by case situation.

In order to mold undercuts and eject plastic parts, the core lifter has a core blade that is attached to one ejector system of the mold, and the opposite end of the core blade is used to mold and eject the plastic part. To mold undercuts, the core blade is placed at an angle determined by the mold designer. Since one end of the core blade is configured to mold the undercut of the plastic part, the core blade is required to move horizontally away from the undercut during a vertical ejection of the plastic part. This horizontal movement is necessary during ejection so as not to damage the plastic part.

The amount of undercut, horizontal displacement required and the ejector system's requisite travel distance determines the angle at which the internal core lifter is seated. After the mold designer has determined the necessary angle for the internal core lifter, it was customary to make a specially designed and manufactured internal core lifter. Many times, the internal core lifter was a one time design. These one time designs are expensive to have built because special made internal core lifters require more research and development and manufacturing costs. These costs are generated because each core lifter is a new project requiring special tailoring of the components to the specific mold with which it is going to be placed.

Specifically, an internal core lifter generally comprises a core blade, an angle seating junction and a support. The core blade usually has an end configured for molding plastic parts, and an opposite end for seating at a desired angle. The core blade is easily cut to the desired length which varies from mold to mold. However, the angle seating junction is not capable of being adjusted from mold to mold. The core blade is fixed at this desired angle by either machining a heel or bolting it to a heel plate at the angle. This welding or bolting permanently fixes the angle at which the core blade is attached. Then using the heel plate the core blade is placed in cooperation with the support plate which is designed to provide linear movement for the core blade. Additionally, the support plate attaches the internal core lifter to the mold in which it is being used. Because the various molds often have a different seating angle, and the angle at which the core lifter is seated is fixed, a specially made core lifters are provided for the several different molds.

When using specifically designed internal core lifters, the mold maker must make the internal core lifter to fit the desired angle of the particular mold. Sometimes the angles are odd angles, which an internal core lifter manufacturer would have no reason to stock because of it being too expensive to inventory such a seldom used angle.

Alternatively, the core blade is pivotally mounted to a coupling which is placed in cooperation with a support plate to guide the coupling's lateral movement. A pivotal mount provides for a range of angles through which the core blade is capable of being seated, and the support plate provides for linear movement. However, the disadvantages are directed toward the durability of this internal core lifter. The pivotal mount is generally done using a pin or circular dowel configurement. In molding, a large amount of force is transferred through the core lifter. This force is required for successful molding to completely fill the steel cavities with plastic, thus forming a correct plastic part. In this arrangement, the large force is transferred through the core lifter which requires the transfer of force through the pivotal mount. The lack of sufficient surface area over which to distribute the molding force when the molding force is transferred between the connecting elements of the pivotal mount creates a large concentration of pressure which in turn may cause conventional pivotal mount methods to fail or to wear excessively. Because of a lack of surface connection area in previous pivotal mount methods, the durability of the core lifter is substantially reduced using this method. When the internal core lifter fails, it can cause damage to the molding process, such as deformed plastic parts and damage to the mold itself.

Previously used core lifters using a dowel type arrangement to pivot the core blade have been unacceptable due to its lack of durability. The core blade requires a high component of durability in order to withstand the forces created in molding operations. Thus, it is undesirable to use pivot connections which do not efficiently and effectively transfer the force.

The present invention is directed toward a new and improved universal internal core lifter which can effectively mold and ejects plastic parts from a mold without having to be specially manufactured for specific angles. A further object is to have an universal internal core lifter that is durable. These and other objects will become apparent from the following detailed description and the appended claims.

SUMMARY OF THE INVENTION

In accordance with the present invention, a new and improved internal core lifter is provided which readily seats to any angle a mold maker would use. This universal core lifter substantially reduces the number of custom core lifter designs and inventories because the universal core lifter can be cut to a desired length and can be mounted at the desired angle within a range of all practical angles. To allow for the required travel, the universal core lifter system is able to both pivot and translate at the end opposite the configured end for molding the plastic part. To obtain the preferred pivoting and translating movement, the pivoting end of the core blade is mounted to a universal coupling which has a translating surface sliding along a support. The preferred support may have a dovetail linear sliding interaction with the universal coupling, and likewise an arcuate dovetail may be provided on the universal coupling to receive a curved heel on the mounting end of the core blade.

In a mold, there is a tremendous amount of force placed on the core blade when the mold is closed to assure that the plastic completely fills the cavity surface area. The design of the universal core lifter of the present invention can handle the tremendous molding forces that are placed on the pivoting joint. One advantage of the present invention is in that the surface area provided in connecting the core blade to the universal coupling and in the connection between the universal coupling and the support is very large. With this large area, the molding pressure applied to the core blade, when the mold is closed, is distributed to the support through the universal coupling over a large, radial surface. This large surface prevents concentration on a small area which further prevents damage to the mold, including the plastic part being molded and the universal core lifter itself.

BRIEF DESCRIPTION OF THE DRAWINGS

The present invention will be described in connection with the accompanying drawings, which illustrate the preferred embodiments and details of the invention, and in which:

FIG. 1 is a perspective view of an universal internal core lifter embodying various features of the present invention;

FIG. 2 is enlarged perspective view of the universal internal core lifter of the present invention being separated into three parts to display its elements;

FIG. 3 is a side view of the universal internal core lifter of the present invention depicting the pivotal feature;

FIG. 6 is an enlarged elevational view of an undercut from a plastic part.

DETAILED DESCRIPTION OF THE PREFERRED EMBODIMENT

Figure 5:
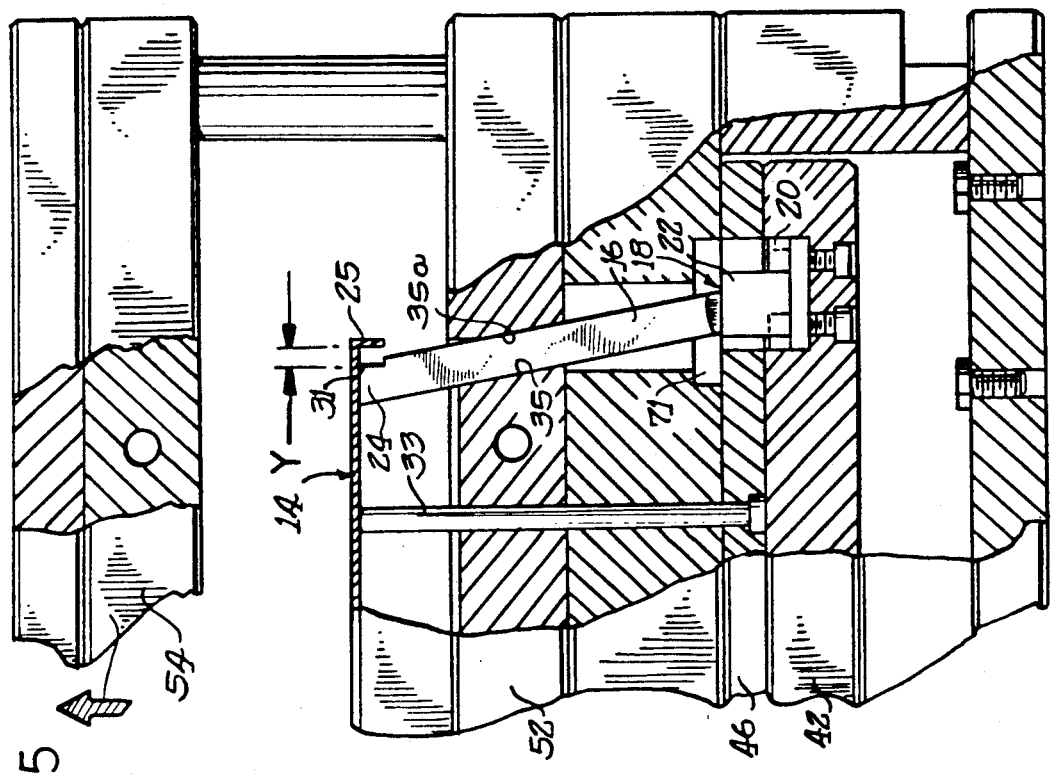
FIG. 5 is a cross-sectional view of a mold in the open position using the universal internal core lifter of the present invention for ejecting the plastic part.
Figure 4:
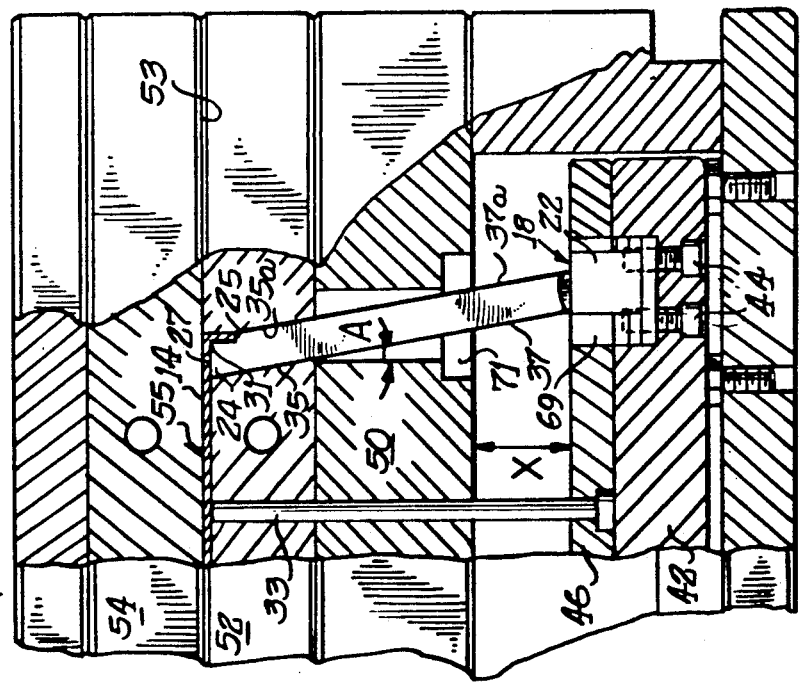
FIG. 4 is a cross-sectional view of an assembled mold in the closed position using the universal internal core lifter of the present invention for molding the plastic part.

It is common in plastic injection molding to use an internal core lifter for molding and ejecting plastic parts. A common internal core lifter 10, as shown in FIG. 1, is used in a mold 12 to mold features of a plastic part 14, as shown in FIG. 4, when the mold is closed, and to eject plastic parts from the mold, as shown in FIG. 5, when the mold is open. More particularly, an internal core lifter 10 consists of a core blade 16, an angle seating junction 18 and a support 20.

As best seen in FIGS. 4 and 5, the internal core lifter 10 is used with a lower core plate 52 and an upper cavity plate 54 which when closed meet along a parting line 53. An internal cavity shape 55 formed on these core and cavity plates is in communication with the plastic injection port with the plastic being injected in a molten state at very high pressures. Also, forming part of the mold cavity is an end 24 of the core lifter where the end 24 is configured to mold, in this instance, a depending lip or flange 25 on the plastic part as well as an adjacent portion 27 on the plastic part which is molded against top surface 29 of the internal core lifter. The depending flange 25 may extend downwardly and inwardly at a small angle to the vertical such as to provide an integral snap flange or lock or catch member. Because the plastic part is inclined downward and inward, the depending flange 25 can not be lifted directly in the vertical direction because of the mold steel at the corner 31 (FIG. 4) unless this mold steel corner is moved inwardly as shown in FIG. 5 to release the depending flange 25 when ejector pins 33 eject the part 14 as shown in FIG. 5.

As seen in FIG. 4, the core lifter 16 is inclined at angle "A" to the vertical and has one side 37 guided by a similarly inclined surface 35 on the core plate 52. An opposite side 37a of the core lifter engages and slides along a similarly inclined surface 35a on the core plate 52. The angle "A" is varied from mold to mold depending on the part being made and the amount of lateral displacement that the upper end 24 is desired to travel. Various molds have different thicknesses for their respective core plates 52 and core support plates 50 as well as different travel distances for their pin retainer plate 46 which travels upwardly from the mold's closed position of FIG. 4 to the mold's open position of FIG. 5. As shown in FIG. 4, the pin retainer plate 46 travels upward "X" distance during plastic part ejection. Typical core lifters may be in lengths of 8 inches to 14 inches long and have different cross sections for example $\frac{1}{2}"\times\frac{1}{2}"$; $\frac{3}{4}"\times1"$; $\frac{3}{4}"\times1"$; $\frac{3}{4}"$ diameter. The typical displacement in the direction away from the undercut is less than $\frac{1}{2}$ inch, but this distance varies depending on the function of the plastic part. As shown in FIG. 5, the typical displacement is represented by "Y." Because of these various angles, lengths, cross sectional dimensions and lengths, historically, a new special core lifter must be machined to the size and angle desired for the particular mold being used. Thus, there is a need for a new and improved universal core lifter that can be used at various angles as required through a range of angles.

In accordance with the present invention, there is provided a universal core lifter 10 which can be swung through a range of angles, as shown in FIG. 3, to accommodate the angle of the mold surfaces 35 and 35a against which sides 37 and 37a of the core lifter blade 16 will mate and having a cam engagement as the mold opens and closes and ejector plate 42 is stroked forward. The core lifter 10 includes a universal coupling 22 which translates along a bottom support 20 and which has a wide surface area for pivotally mounting the lower end of the core blade. The tremendous amount of molding pressure applied to the core blade, when the mold is closed and the plastic is injected, is distributed across the wide arcuate, mating surfaces 30 and 32 of the core blade and the universal coupling 22 respectively. This force distribution over this wide area of mating and pivoting surfaces prevents concentration of the loads on a small area, such as a dowel pin, that would rapidly wear or become damaged due to the large forces encountered.

Referring now to FIGS. 1-3 for a more detailed description, the preferred core blade 16 is generally a rectangular metal shaft, but it can be square, round or any other specific profile. The core blade 16 is cut the length required for the mold in which the lifter is going to be employed. As seen in FIG. 4, the length is generally defined by the distance required to extend between the mold cavity 11 and the pin retainer plate 46.

As shown in FIG. 1, the core blade 16 has a molding end 24 which is configured with an inclined surface 41 used for molding undercuts and the like. The molding of these undercuts (FIG. 6) is a general reason why the internal core lifter is required to eject these parts in order so they do not break. The end 24 is machined specifically for molding a part that cannot be ejected without the use of a laterally shiftable core lifter.

Referring to FIG. 2, the pivoted end 26 on the core blade opposite the molding end 24 pivotally mounts the core blade on the universal coupling. The core blade 16 has an arcuate surface 30 which mates with an arcuate surface 32 on the universal coupling 22. These arcuate surfaces slide relative to each other and provide the universal angle feature of the present invention as displayed in FIG. 3. That is, this pivotal movement allows the universal internal core lifter 10 of the present invention to be seated at any angle allowing it the flexibility to be used in a plurality of molds having different angles without costly, engineering modifications. For example, the pivotal ability allows the core blade to sit at the angle "A" inside the mold, as shown in FIG. 4 displaying the universal core blade of the present invention employed within a mold.

The lower end of the core blade is connected to the universal coupling 22 by a circular dovetail heel 43 which is received in a circular dovetail 28 in the universal coupling. The dovetail end includes a recess 45 defined between curved upper and lower sidewalls 47 and 49.

The universal coupling 22 of the present invention receives the circular heel 26 of the core blade 16 using a circular dovetail 28. The curvature of the dovetail is similar to the circular dovetail heel 43 thereby allowing the core blade to travel through a range of angles. The curved, concave surface 30 of the core blade mates smoothly with the arcuate surface 32 of the universal coupling. The mating of these curved surface bearing creates a junction which can transfer the force applied to the core blade to the universal coupling which in turn can be transferred to the support 20.

The circular dovetail 28 in the universal coupling 22 is located above the arcuate surface 32 and includes curved upper sidewalls 51 located above a recess cut in a vertical sidewall 55. When the lower pivoted end is mated in the dovetail, the curved walls 49 and 51 are engaged for sliding movement as the core arm 16 pivots between the opening and closing of the mold. Also, the inner facing vertical sidewalls 55 on the coupling having sliding contact with the recess walls 45 as shown in FIG. 1.

The universal coupling 22 translates along the support 20 when the mold shifts between its open and closed positions. This sliding movement is also accompanied by the transfer of forces between the coupling and the support. Herein, the universal coupling has a standard linear dovetail 34 for receiving a standard T-gib 36 of the support 20. A flat horizontal surface 38 on the universal coupling 22 mates with a flat horizontal surface 40 on the support 20. These flat, wide surfaces provide for acceptable transfer of force to the support 20 of the pressure placed on the core blade 10 during molding thereby increasing the durability of the universal internal core lifter.

The support 20, which contains the T-gib 36, can be of different lengths depending on the amount of linear travel required of the universal coupling and core blade during ejection of the plastic part when the mold is opened. The support is fastened to the ejector plate 42 by threaded bolts 44 threaded into threaded bores in the bottom surface of the support.

From the foregoing, it will be seen that in use, the core blade 16 extends upward from the junction 18 and through an opening 69 in a pin retainer plate 46 and through an opening 71 in the support plate 50. In an alternate mold, the support plate is omitted in favor of a thicker core plate. When the mold is closed for molding as seen in FIG. 4, the upper sides of blade walls 37 and 37a are abutting the inclined walls 35 and 35a on the core plate and the inclined surface 41 and top surface 29 on the upper end 24 of the core lifter become a part of the molding cavity 11. The molding cavity 11 is defined by the core plate 52, cavity plate 54 and these walls on the core lifter.

When the mold cavity 11 is opened for ejecting the plastic part 14, as seen in FIG. 5, the ejector plate 42 raises the ejector pins 33 and also raises the universal core lifter 10 which at this time has its lower end sliding linearly on the T-gib 36 of support 20. The core lifter assists in lifting the plastic part 14 from the cavity. This upward movement of the core lifter along the mold surfaces 35 and 35a causes the molding end 24 to slide away from the undercut flange 25 so as not to cause damage to the undercut flange on the plastic part.

Thus, the core blade moves linearly away from the undercut flange 25 when the mold is being opened for ejection of the plastic part. That is, as the cavity plate 54 is raised, the ejector plate 42 raises the core lifter and, because of angle "A," the end 24 slides linearly away from the undercut flange 25. As the ejector plate 42 raises, the seating junction 18 for the core blade moves linearly along the support 20 in order for the core blade to accommodate the inclined angle "A" of the inclined wall 35. More specifically, the upward movement of the ejector plate 42 forces the core blade upward, and because the core blade is restricted by the inclined mold wall 35 and a second inclined mold wall 35a on the other side of the core blade, the upper end 24 of the core blade moves to the left, and the universal coupling 22 translates left along the T-gib 36 of the support plate 20 as shown in FIG. 5. When the ejector plate 46 moves downwardly, it pulls the support 20 down and the linear and curved dovetails act to pull the upper end of the core plate down; and when the mold is closed, the upper end of the core lifter is positioned for molding the next part as shown in FIG. 4.

An added benefit of the circular dovetail is that, if the ejector plate 42 becomes cocked at an angle because it is being stroked forward, the core blade is capable of adjusting around the radius of the universal coupling 22. Therefore, the core blade wall 37 and 37a do not interfere with surfaces 35 and 35a on the core plate 52. Thus, if the circular dovetail was not present, the core blade or the core molding area could be damaged.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:
1. A mold for molding plastic parts, comprising:
a first mold half having surfaces defining a portion of a mold cavity;
a second, ejector, mold half having surfaces defining a portion of the mold cavity;
the mold halves being movable between a closed position to mold the part and an open position in which the mold halves are spaced to eject the plastic part; and a universal internal core blade lifter having an end with a surface cooperating with the mold halves surfaces in molding the plastic part and disposed at a predetermined angle to the vertical;

a core blade on the lifter having the surface to cooperate with the ejector mold half to mold the plastic part and having an opposite end pivotally mounted;

the core blade surface movable laterally away from an undercut in the molded part and in a direction to assist in ejection of the molded plastic part;

a coupling on the lifter pivotally mounting the opposite end of the core blade; and a support for mounting the coupling to the other mold half and mounting the coupling for linear travel to move the opposite end of the core blade in a linear path as the mold halves shift between open and closed positions, said pivotal mounting allowing the core blade to pivot from the predetermined angle to prevent binding of the support in the mold halve and allowing the core blade to be used in other molds at an angle other than the predetermined angle.

2. An internal core lifter apparatus for use with a plurality of molds requiring different angles in different molds, the apparatus comprising:

a core blade having a first end configured by an end user to cooperate with one of the molds to mold a plastic part having an undercut and an opposite end on the core blade being pivotally mounted;

the first end of the core blade movable in the ejecting direction to assist in ejecting the plastic part from the mold;

a coupling pivotally mounting the opposite end of the core blade for seating at the requisite angle for the mold to allow plastic part ejection; and a support mounted to an ejector plate having a sliding surface for linear travel of the support relative to said ejector plate to shift the first end of the core blade to allow the core blade to travel away from said undercut in the plastic part and then to travel to assist the ejector plate in ejecting a molded part.

3. An internal core lifter apparatus for sue with a plurality of molds ...ü ... ig disposed at different angles in different molds, the apparatus comprising:

a core blade having a first end configured to cooperate with one of the molds to mold a plastic part;

a universal coupling that provides for pivotal seating and linear motion and which receives the core blade for attachment at an end opposite the end configured to mold the plastic part;

said pivotal seating allowing the positioning of the core blade at different angles in different molds;

an ejector means in the mold for ejecting the molded plastic part;

the first end of the core blade movable in the ejecting direction to assist in ejecting the plastic part from the mold; and a support plate for mounting to the ejector means and having a sliding surface across which the universal coupling slides while the first end of the core blade moves laterally relative form the plastic part when the mold opens.

4. An internal core lifter in accordance with claim 3 in which the universal coupling includes an arcuate dovetail for pivotally mounting of the core blade.

5. An internal core lifter in accordance with claim 4 wherein the arcuate dovetail has wide, arcuate surfaces mating each other.

6. An internal core lifter in accordance with claim 3 in which a linear dovetail between the universal coupling and the support plate guides the linear travel of the universal coupling.

7. An internal core lifter apparatus for use with a plurality of molds having mold halves and being disposed at different angles in different molds, the apparatus comprising:

a core blade for having an end configured for molding a plastic part having an undercut and an opposite end having a heel with arcuate dovetail surfaces for transmitting and receiving both pushing and pulling forces;

a universal coupling for providing pivotal and linear movement having a first arcuate dovetail for receiving the arcuate dovetail surfaces on said heel of the core blade and for transmitting pushing and pulling forces thereto and having a second straight dovetail;

said pivotal movement allowing the mounting of the core blade at a plurality of angels in the mold, said configured end moving laterally away from the undercut and assisting in ejecting the plast':· pa.t; and a support for mounting to the other mold ialf and having a T-Gib which mates the second straight dovetail of the universal coupling and allows for linear movement away form the undercut in the plastic part.

* * * * *

UNITED STATES PATENT AND TRADEMARK OFFICE
CERTIFICATE OF CORRECTION

PATENT NO. : 5,137,442
DATED : August 11, 1992
INVENTOR(S) : Glenn Starkey It is certified that error appears in the above-identified patent and that said Letters Patent is hereby corrected as shown below:

Column 1, Line 65, delete "a".

Column 2, Line 42, change "ejects" to --eject--.

Column 2, Line 44, change "an" to --a--.

Column 3, Line 24, change "an" to --a--.

Column 3, Line 27, after "is" insert --an--.

Column 5, Lines 44-45, change "having" to --have"--.

IN THE CLAIMS:

Column 7, Line 22, change "halve" to --half--.

Column 7, Line 44, change "sue" to --use--.

UNITED STATES PATENT AND TRADEMARK OFFICE
CERTIFICATE OF CORRECTION

PATENT NO. : 5,137,442

DATED : August 11, 1992

INVENTOR(S) : Glenn Starkey

It is certified that error appears in the above-identified patent and that said Letters Patent is hereby corrected as shown below:

Column 8, Line 13, change "form" to --from--.

Column 8, Line 41, change "angels" to --angles--.

Column 8, Line 46, change "T-Gib" to --T-gib--.

Column 8, Line 48, change "form" to --from--.

Signed and Sealed this

Fifth Day of October, 1993

Attest:

BRUCE LEHMAN

Attesting Officer

Commissioner of Patents and Trademarks